Figure 2:
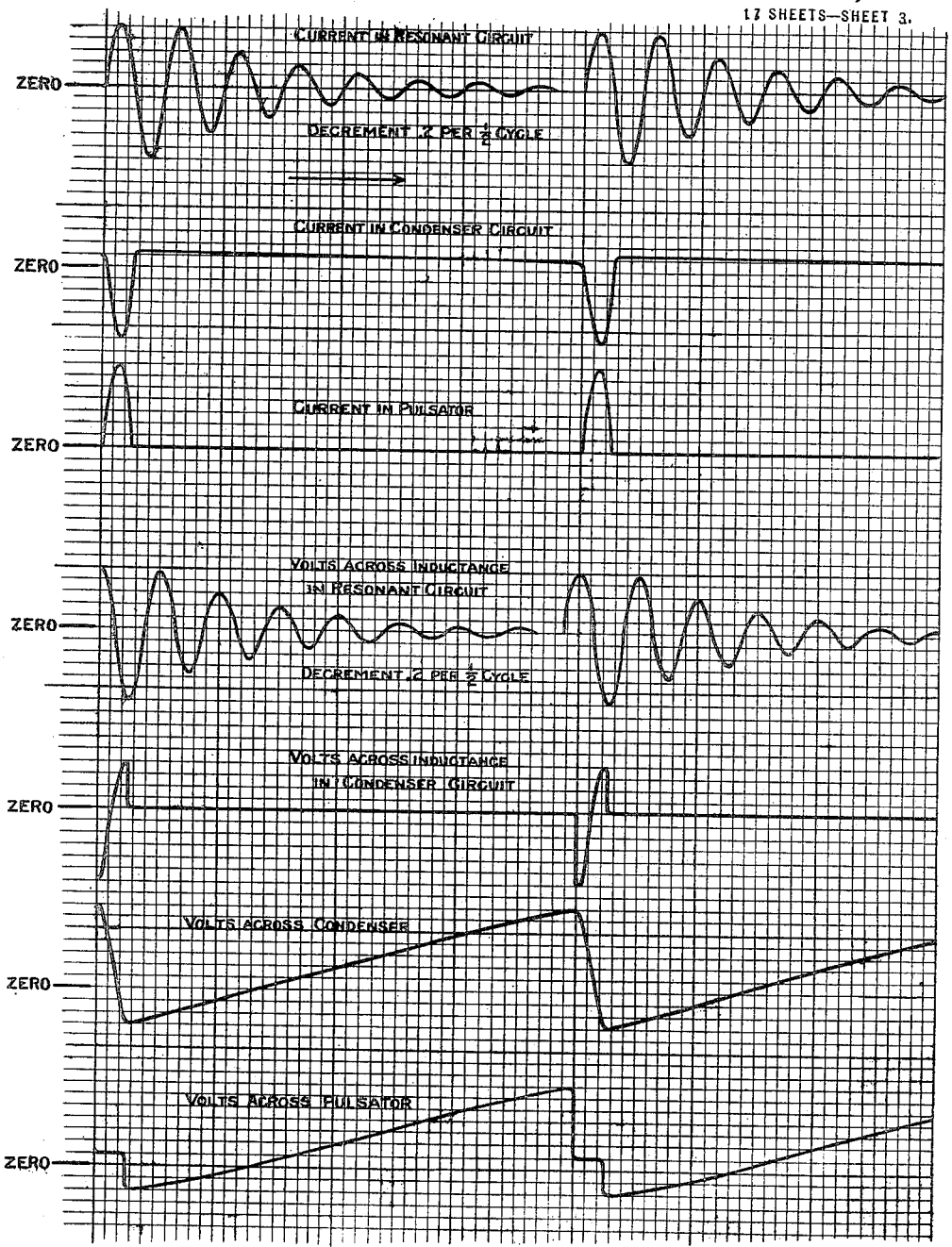

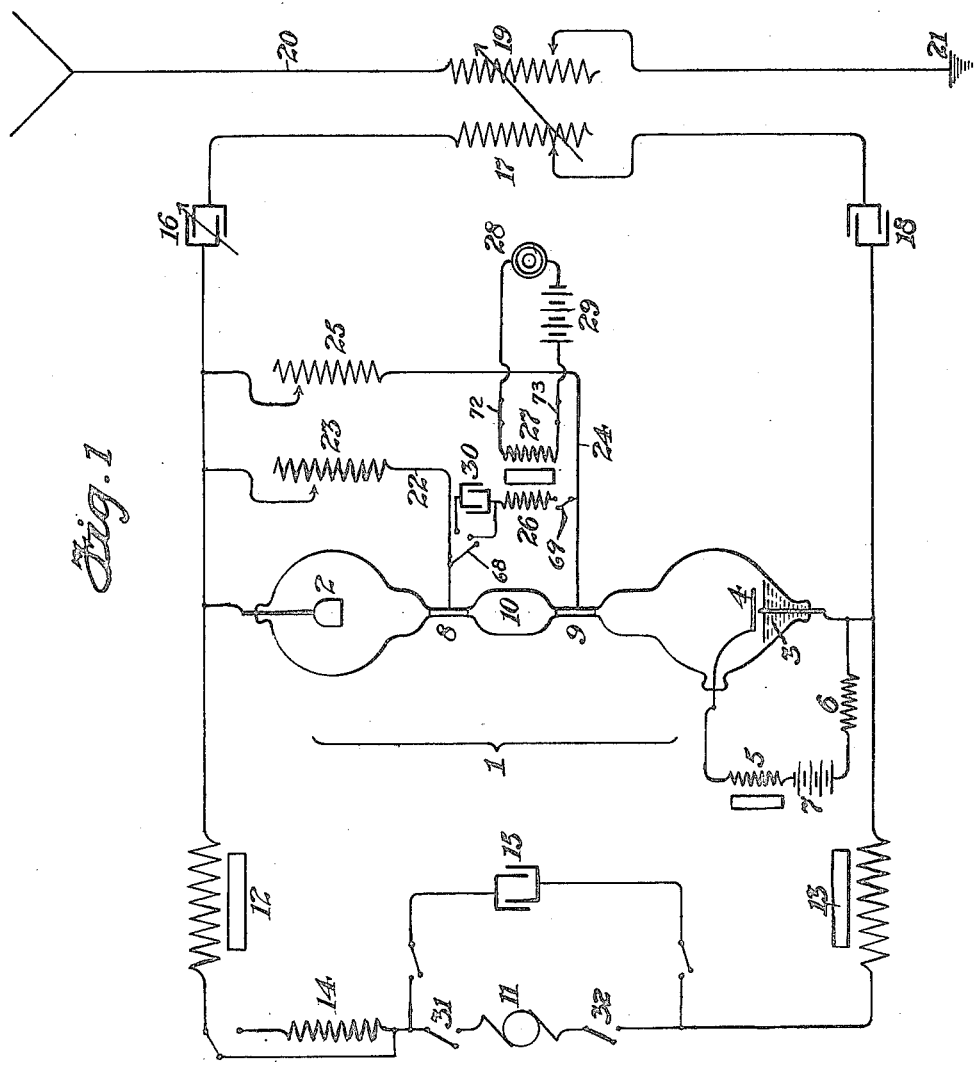

P. C. HEWITT.
METHOD AND APPARATUS FOR THE PRODUCTION AND UTILIZATION OF ELECTRIC CURRENTS.
APPLICATION FILED MAR. 18, 1915.
*Fig. 1ª.*
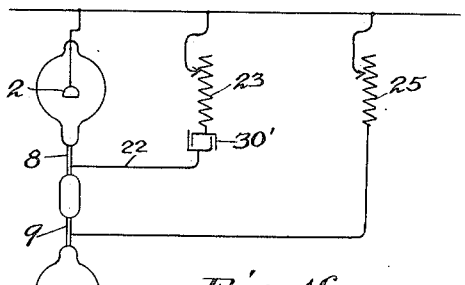
*Fig. 1ᵇ.*
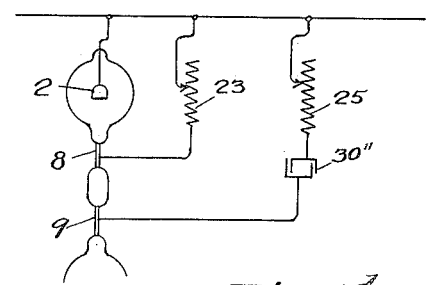
*Fig. 1ᶜ.*
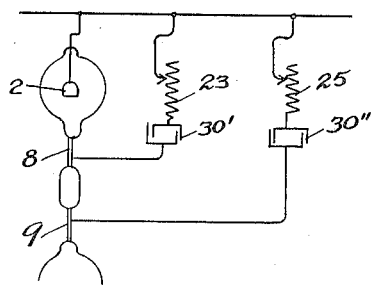
*Fig. 1ᵈ.*
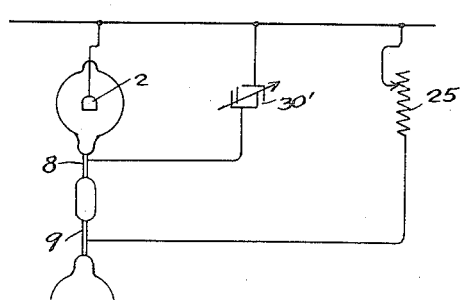
*Fig. 1ᵉ.*
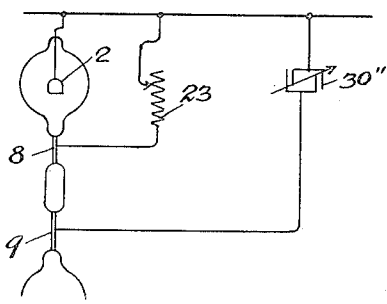
*Fig. 1ᶠ.*
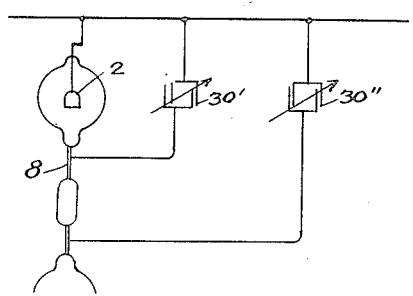
Inventor:
Peter Cooper Hewitt
by Charles A. Terry
atty

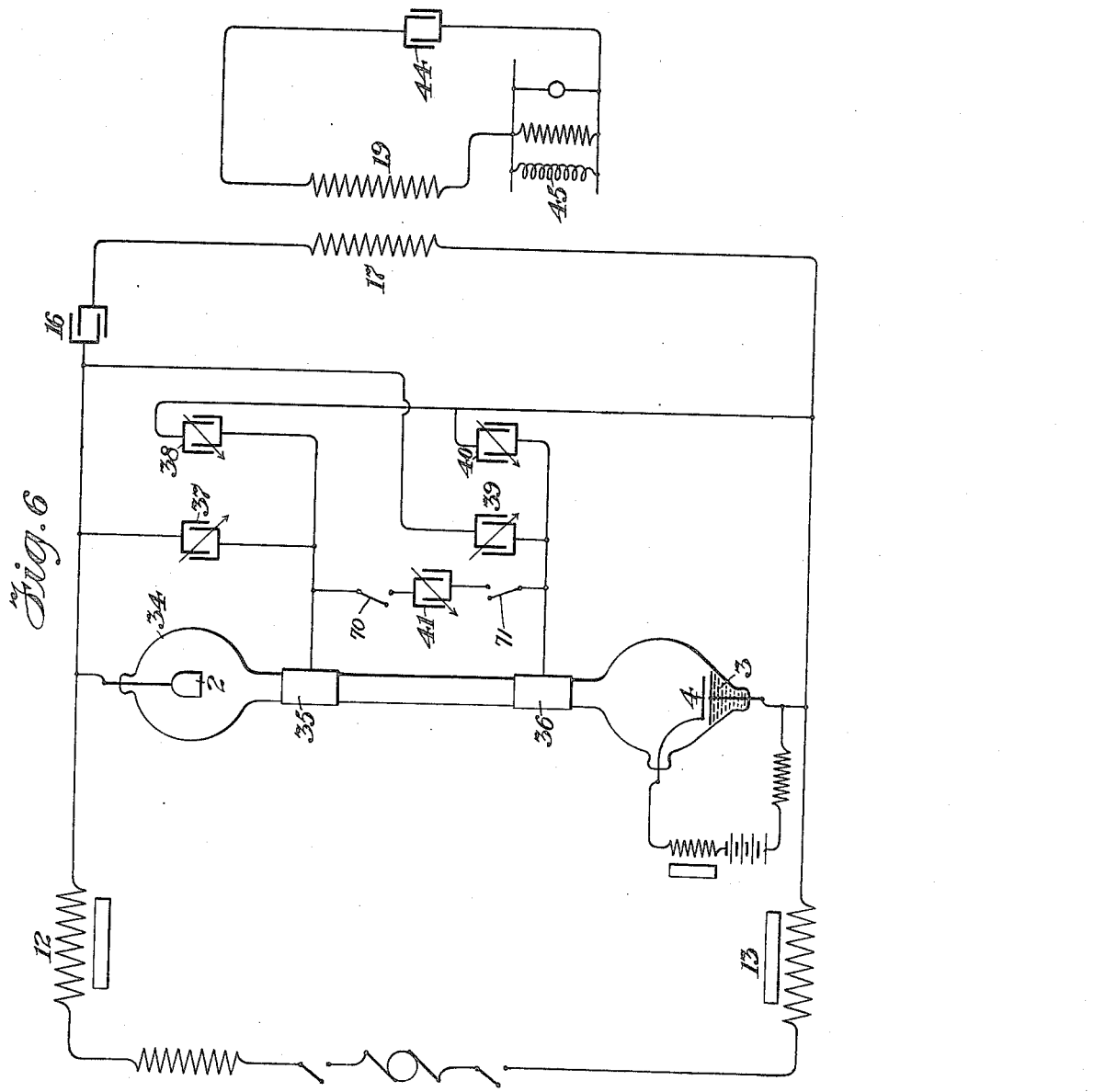

P. C. HEWITT.
METHOD AND APPARATUS FOR THE PRODUCTION AND UTILIZATION OF ELECTRIC CURRENTS.
APPLICATION FILED MAR. 18, 1915.
1,402,931.
Patented Jan. 10, 1922.
17 SHEETS—SHEET 8.

Inventor:
Peter Cooper Hewitt
by Charles A. Terry
Atty.

P. C. HEWITT.
METHOD AND APPARATUS FOR THE PRODUCTION AND UTILIZATION OF ELECTRIC CURRENTS.
APPLICATION FILED MAR. 18, 1915
1,402,931.  Patented Jan. 10, 1922.
17 SHEETS—SHEET 9.
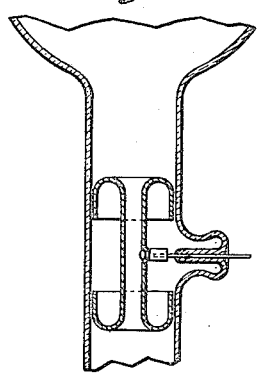
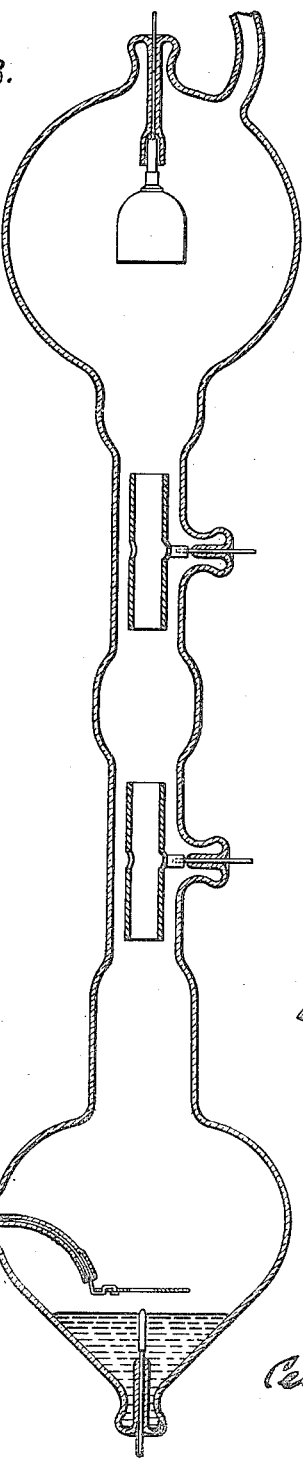
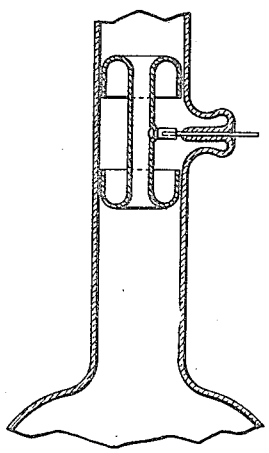

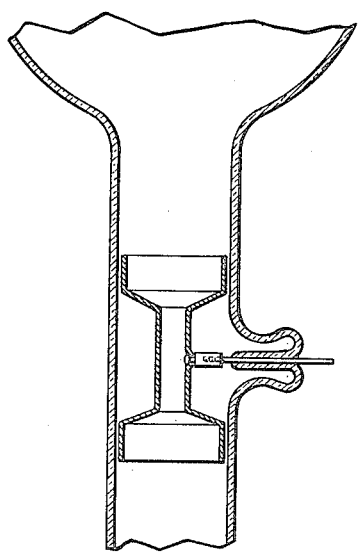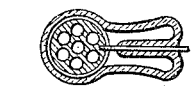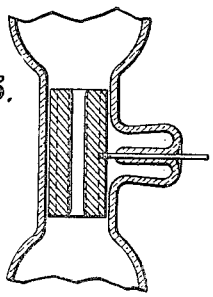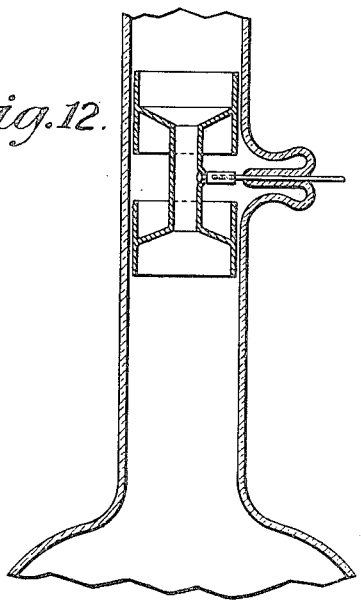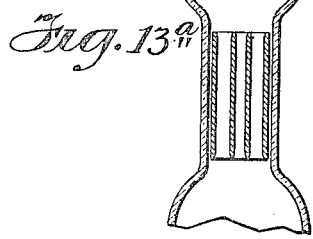

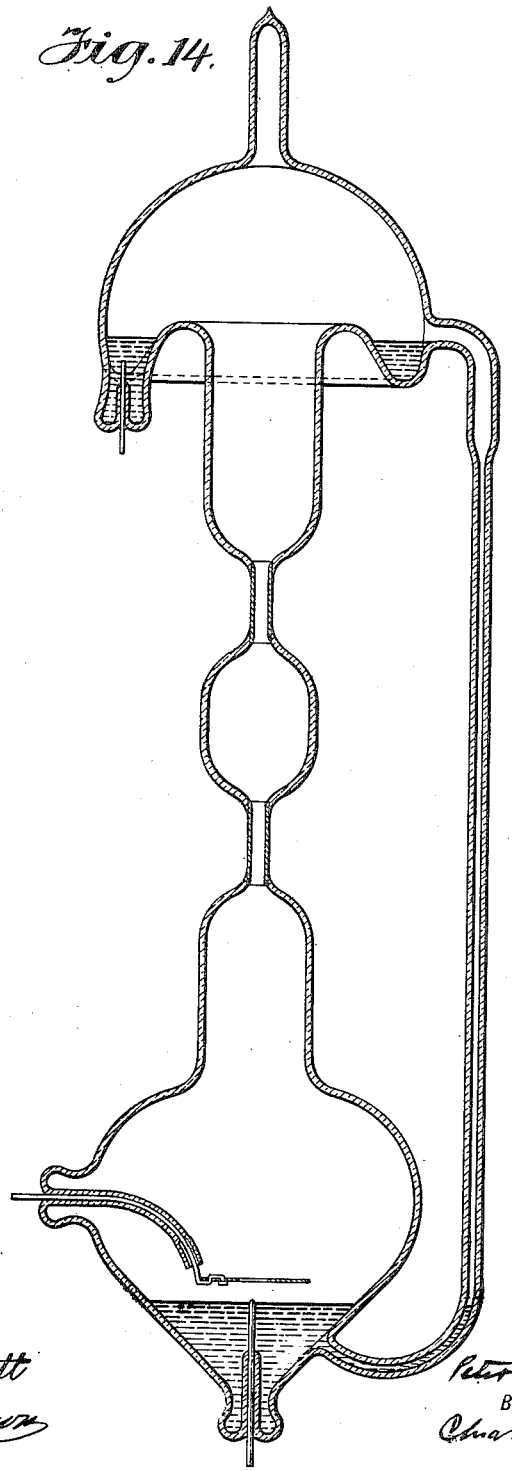

P. C. HEWITT.
METHOD AND APPARATUS FOR THE PRODUCTION AND UTILIZATION OF ELECTRIC CURRENTS.
APPLICATION FILED MAR. 18, 1915.
1,402,931.
Patented Jan. 10, 1922.
17 SHEETS—SHEET 12.
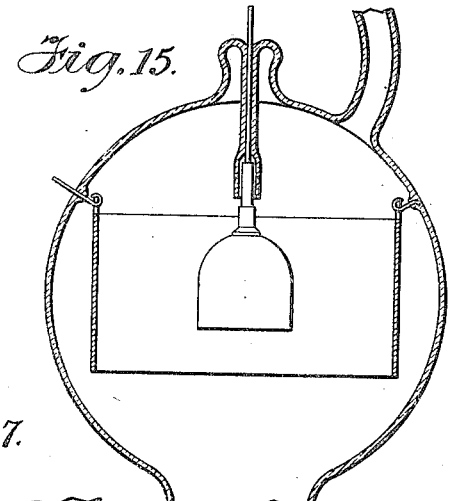
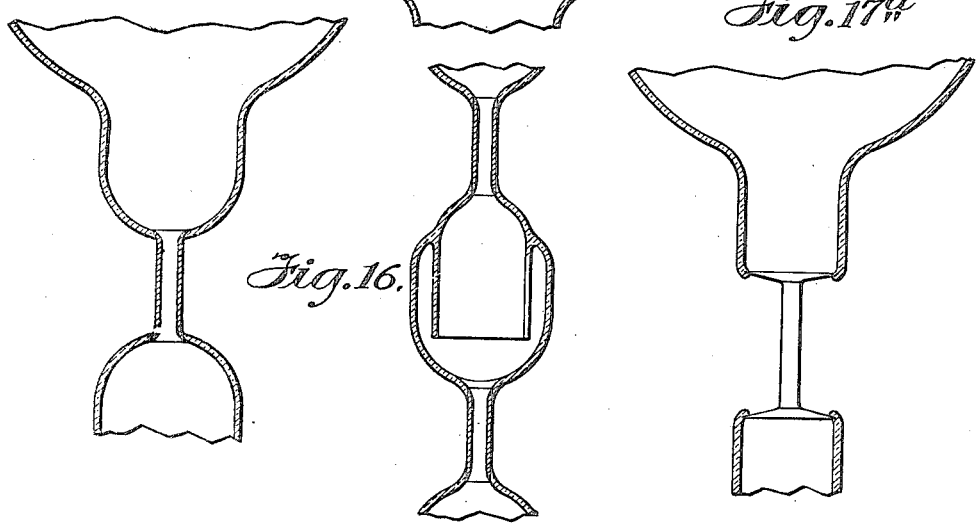
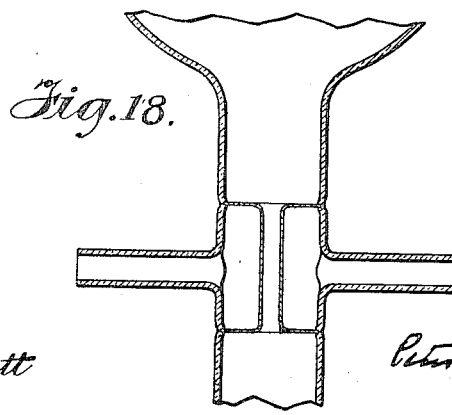

P. C. HEWITT.
METHOD AND APPARATUS FOR THE PRODUCTION AND UTILIZATION OF ELECTRIC CURRENTS.
APPLICATION FILED MAR. 18, 1915
1,402,931. Patented Jan. 10, 1922.
Fig. 19ª.
Fig. 20ª.
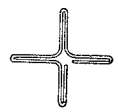
Fig. 19.
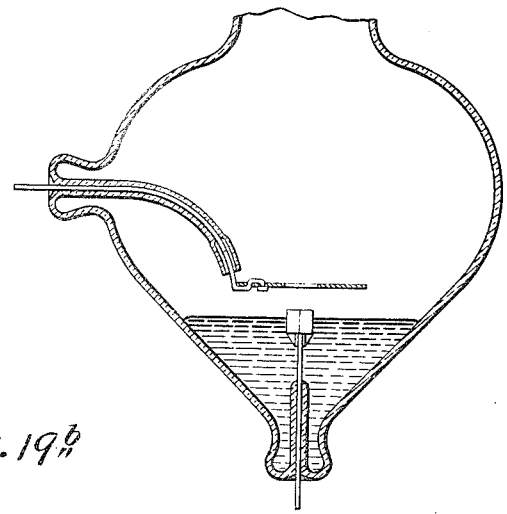
Fig. 19ᵇ.
Fig. 20.
Fig. 21.
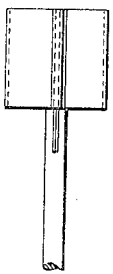
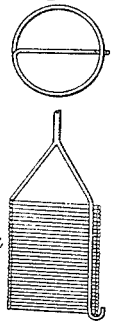
Fig. 21ª.

P. C. HEWITT.
METHOD AND APPARATUS FOR THE PRODUCTION AND UTILIZATION OF ELECTRIC CURRENTS.
APPLICATION FILED MAR. 18, 1915.
1,402,931. Patented Jan. 10, 1922.
17 SHEETS—SHEET 14.
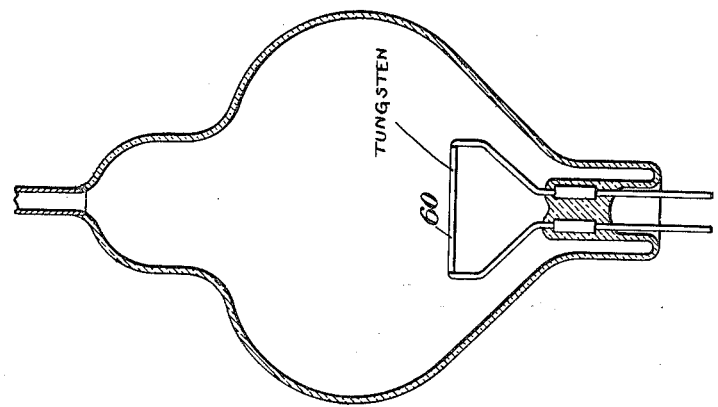
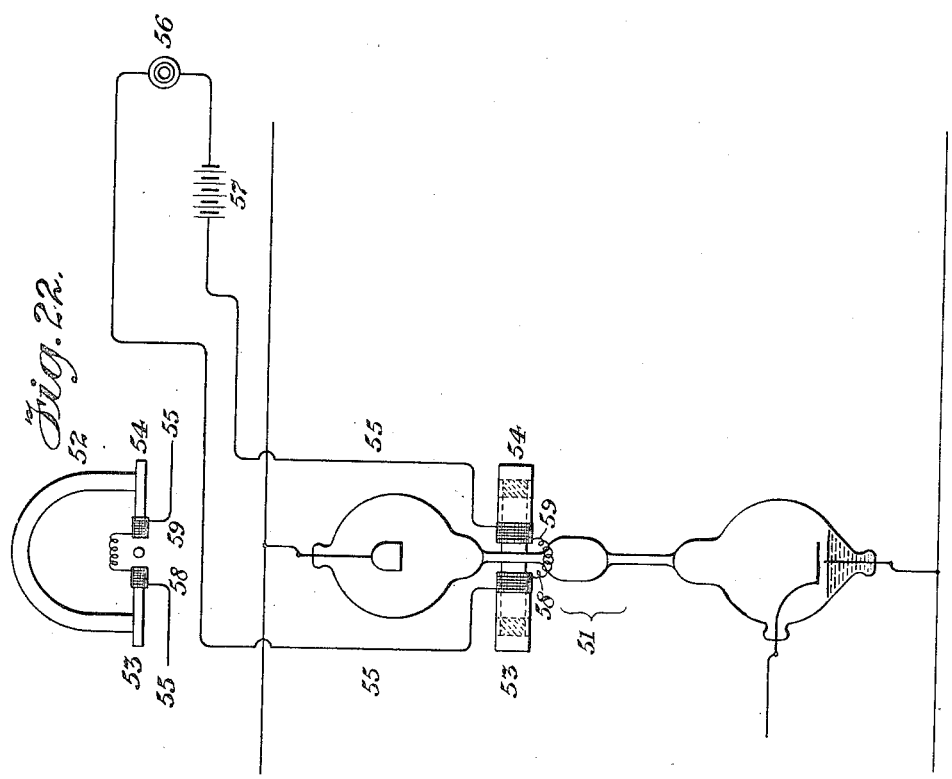

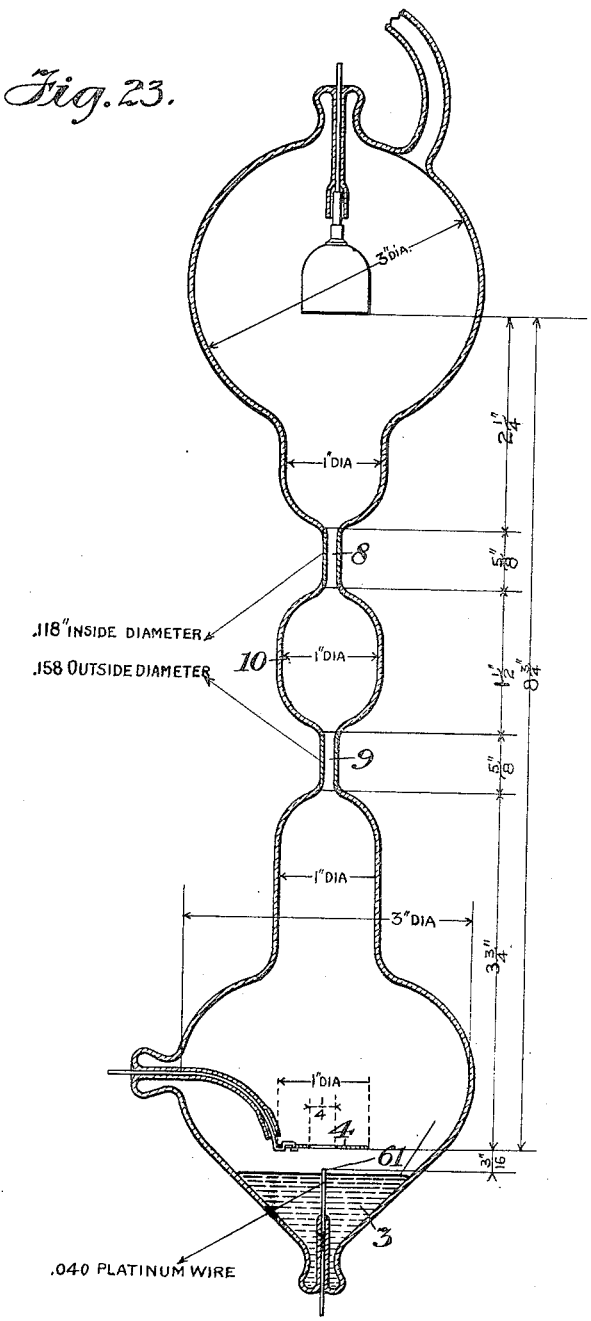

P. C. HEWITT.
METHOD AND APPARATUS FOR THE PRODUCTION AND UTILIZATION OF ELECTRIC CURRENTS.
APPLICATION FILED MAR. 18, 1915.

1,402,931.

Patented Jan. 10, 1922.

17 SHEETS—SHEET 16.

Inventor:
Peter Cooper Hewitt
by Charles A. Terry
atty

P. C. HEWITT.
METHOD AND APPARATUS FOR THE PRODUCTION AND UTILIZATION OF ELECTRIC CURRENTS.
APPLICATION FILED MAR. 18, 1915.
1,402,931. Patented Jan. 10, 1922.
17 SHEETS—SHEET 17.
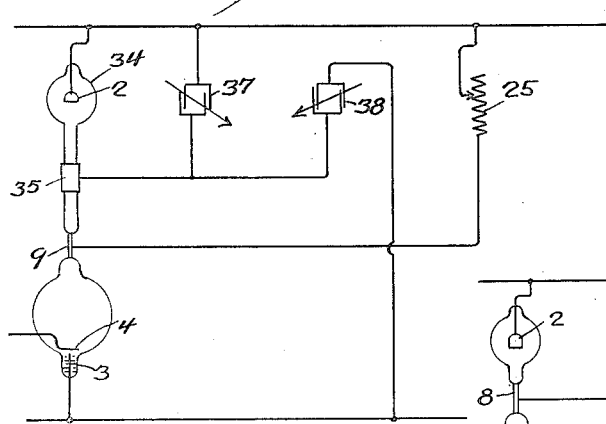
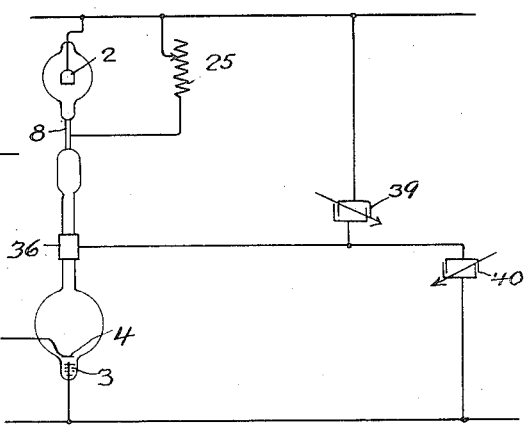
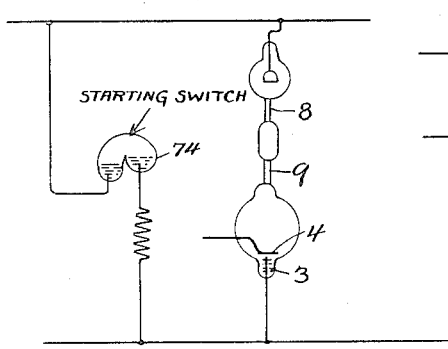
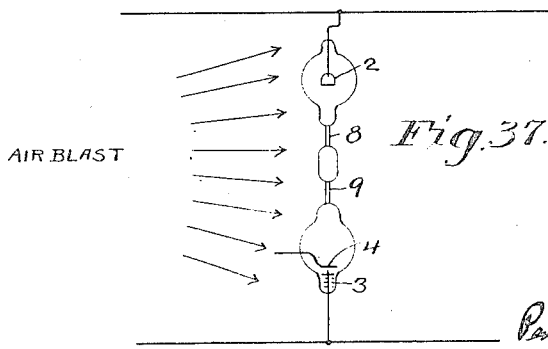

UNITED STATES PATENT OFFICE.

PETER COOPER HEWITT, OF RINGWOOD MANOR, NEW JERSEY.

METHOD AND APPARATUS FOR THE PRODUCTION AND UTILIZATION OF ELECTRIC CURRENTS.

1,402,931. Specification of Letters Patent. Patented Jan. 10, 1922.

Application filed March 18, 1915. Serial No. 15,267.

*To all whom it may concern:*

Be it known that I, PETER COOPER HEWITT, a citizen of the United States, and resident of Ringwood Manor, county of Passaic, State of New Jersey, have invented certain new and useful Improvements in Methods and Apparatus for the Production and Utilization of Electric Currents, of which the following is a specification.

My invention relates to the production of electric pulses of definite time period and the generation therefrom of alternating currents of practically any definite time period, the intermittent generation or reenforcement of the alternating currents at definite time intervals as desired, control of the time period of the pulse and also of the variations of the fundamental time period of the alternating current generated.

The invention comprises a unidirectional, intermittent gas or vapor vacuum device for producing periodic impulses from a continuous direct current wherein control is obtained by forced variations of the characteristics of the path between the electrodes, hereafter called electric pulsator.

The invention comprises an organization and electric circuits for operating the pulsator, for controlling the pulse and its time period, for controlling the alternating currents and controlling their frequency.

The invention comprises generating alternating currents from electric pulses, establishing the time of each with respect to the other as well as the time duration of the pulse, varying the pulse frequency and utilizing the direct results of the change and also establishing a regular continuity of operation, deranging the continuity of operation and utilizing the energy effects of such change and also the reactions due to change of time period of the pulse between it and the alternating current already generated.

The invention also comprises varying the frequency of the alternating current and causing variations in the time period of the pulse.

The invention comprises feeding an alternating current circuit by means of a unidirectional circuit and controlling both circuits by the feed circuit.

The invention comprises utilizing the existence of the fact that there may be one or more resonant frequences of different value and different resonant characteristics between two circuits, consisting of fixed capacity for varying the time period of one circuit by the other and also for varying the power radiated from one circuit. One way of doing this is by inductance and resistance and by the intermittent supply of energy from one circuit to the other and varying the time of supply whereby the resonant frequency characteristics of one circuit are modified by the other and the frequency is caused to change and, when desired, to change definitely, and also in causing two interacting circuits of different fixed time to function in the same time period during the time of passage of current in both circuits and vary this time period by the time of intermittent supply of energy to one circuit and also by the time duration of such supply (pulse), and in controlling the time period of intermittent supply of energy. The invention includes controlling the pulse by the pulsator.

The invention also comprises control of the time frequency of the discharge by means of the device and the time of duration of the discharge by the circuit.

The invention also comprises control of the voltage of operation of the device by means of control of the device modified by the geometrical characteristics of a specific device.

The invention also comprises means for operating a gas or vapor device at one or more thousands volts without relying on the voltage reactions of the negative electrode.

My invention consists not only in providing means whereby the pulsator may be controlled by means of alternating currents generated, but broadly defines how intermittent energy supply may be controlled, namely by establishing control of the means causing the intermittence of supply from the source, and in generating alternating currents from the intermittent currents and in controlling the supply by means of alternating currents affecting the time of intermittence and also causing variation of the system by auxiliary means.

My invention is useful in the arts for creating alternating currents of definite frequency and of any frequency from direct currents for power or other purposes and for varying the frequency of the alternating currents generated, also for creating alternating currents from alternating currents, for relaying, repeating, boosting, multiplying, increasing and diminishing alternating current waves of large energy as well as telephone currents; in fact for innumerable purposes and for producing alternating currents for wireless telephony and telegraphy transmission, such as continuous alternating currents and trains of alternating currents above and below audible frequencies, and particularly in connection with power transmission, for creating alternating currents from direct current and varying the frequency.

When the pulsator is supplying energy to a circuit, the circuit may be made to control the time period of the pulse and cause it to be synchronous with it. This may be accomplished by connecting one side of the circuit through a small condenser to the upper section of the pulsator. This is useful for circuits of varying frequency and particularly in connection with an oscillatory circuit of fixed time period. In the same manner, an auxiliary circuit may be used for the purpose of controlling the time of the pulse.

The apparatus consists of an extremely sensitive organization which is capable of being controlled in a multiplicity of ways and particularly by the association of capacity with various parts, by the influence of small currents and by magnetic action of small magnitude.

The invention is here explained by describing a form of device and an organization and electrical connections for operation and certain results of operation by illustrative diagrams, thereafter reciting some of the many modifications of the device and organizations by which the invention may be practiced and various means of control.

Figure 31:
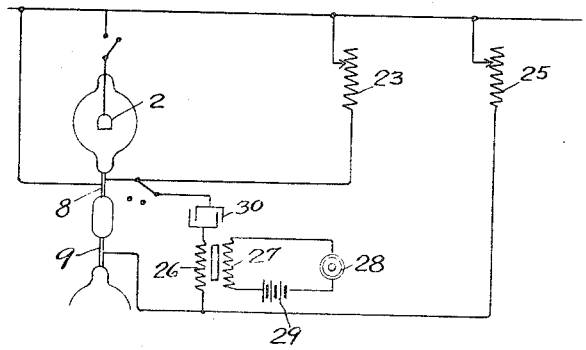
Figure 32:
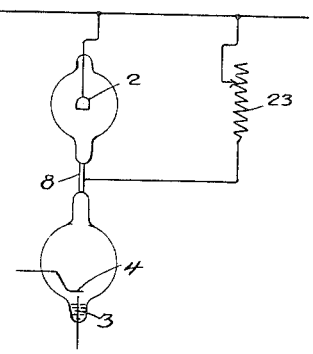
Figure 33:
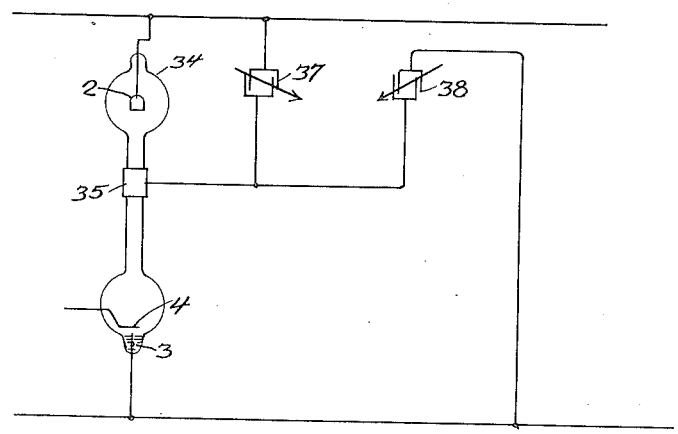
Figure 7:
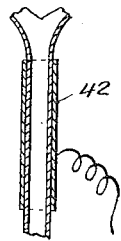
Figure 7A:
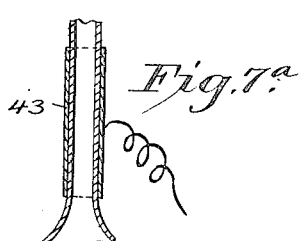
Figure 25:
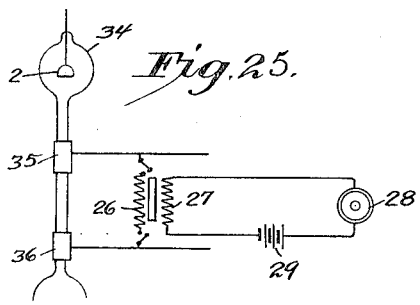
Figure 26:
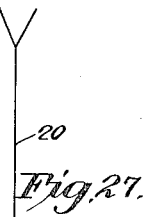
Figure 27:
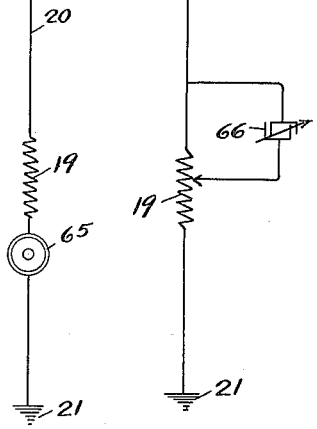
Figure 28:
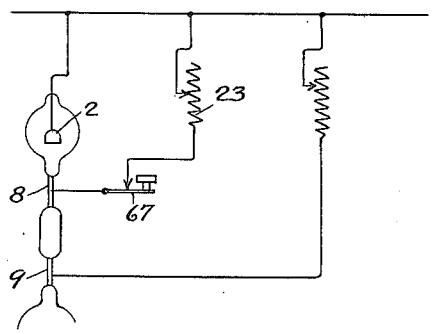
Figure 29:
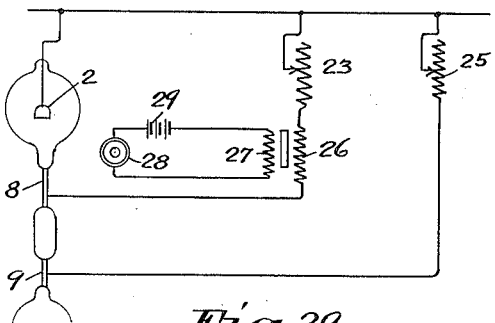
Figure 30:
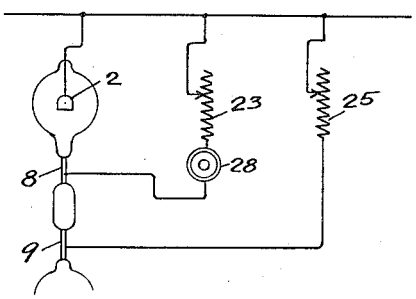

In the accompanying drawings Figure 1 is a diagram showing a general organization of elements and apparatus for embodying and carrying out my invention, a vacuum, gas or vapor device being shown, having control tubes forming a part of the wall of said device, said control tubes being connected to the mains through current limiting devices, in this instance, resistances; Figures 1$^a$, 1$^b$ and 1$^c$ show various ways in which a condenser or condensers may be connected in the control circuits to modify or limit the current flow therein; Figures 1$^d$, 1$^e$ and 1$^f$ show the use of one or more condensers in the control circuits of Figure 1 for adjusting the current flow therein; Figures 2 to 5, inclusive, show the cycle of voltage and current changes in each part of the discharge and resonant circuits for various settings of the apparatus; Figure 6 shows an alternative arrangement of control circuits of Figure 1, bands or coating of conducting material and variable condensers taking the place of the control tubes and resistances of Figure 1; Figures 7 and 7$^a$ are modified constructions of control terminals wherein one static band connected to the positive or the negative is used to modify the action of the apparatus; Figures 8, 9, 10, 11, 12, 13, 13$^a$, 13$^b$ and 13$^c$ show modified constructions of the control terminals 8 and 9, the terminals being located inside the vacuum, gas or vapor tube; Figure 14 shows an alternative form of vacuum, gas or vapor tube having a positive terminal formed of mercury and an arrangement for insuring a sufficient supply of the conducting material; Figure 15 shows the positive end of the evacuated tube provided with a shield surrounding the positive electrode to catch projected matter from said electrode during operation; Figure 16 shows a shield in proximity to the wall between the control tubes 8 and 9 for insuring proper insulation therebetween; Figures 17, 17$^a$ and 18 are modified forms of control tubes adapted to protect the glass wall of the container from heating effects; Figure 18 showing an arrangement for applying a circulating cooling medium to the control tube; Figure 19 shows a special form of projection for the negative electrode, Figures 19$^a$ and 19$^b$ being an enlarged cross section and a vertical section, respectively, of the same; Figure 20 shows an alternative embodiment of a negative electrode projection; and Figure 20$^a$ is a plan view thereof; Figures 21 and 21$^a$ show a plan and sectional elevation of a positive electrode formed of tungsten in the form of a cylinder; Figure 22 shows a pulsator controlled by magnetic action; Figure 23 is a dimension drawing of one form of pulsator; Figure 24 illustrates the construction at the negative end of the pulsator when a solid cathode, such as tungsten, is used; Figure 25 shows an arrangement for impressing on the control terminals of Figure 6 variations from an independent source, such as a microphone; Figures 26 and 27 are alternative forms of aerial, including a microphone and a condenser, the microphone and condenser varying the characteristics of the aerial; Figures 28, 29, 30 and 31 show alternative embodiments of the arrangement of Figure 1 showing devices for impressing electrical variations on the vacuum, gas or vapor tube; Figure 32 shows an arrangement of apparatus for controlling the tube by the use of one control tube; Figure 33 shows an arrangement for controlling the vacuum tube by the use of one band or coating of conducting material; Figures 34 and 35 show alternative arrangements for controlling the vacuum tube by the use of one control band and one control tube; Figure 36 shows a starting arrangement for the vacuum tubes; and Figure 37 shows diagrammatically a cooling arrangement for the vacuum tube.

The device consists of an exhausted vacuum gas or vapor tube, here called the pulsator, 1, consisting of a positive electrode, 2, in a glass chamber connected to another glass chamber containing a negative electrode, 3, consisting of a mercury negative and keep-alive positive, 4, in operative relation thereto having inductance, 5, resistance, 6, a direct current source of current, 7, (here shown as a storage battery) with suitable connections to form the circuit. These two chambers are connected by means of two connecting tubes of platinum, 8, and, 9, insulated from each other by a glass bulb, 10.

The pulsator 1 is connected by means of its electrodes 2 and 3 across a direct current source, 11, having inductance, 12, and, 13, in the respective leads. A resistance, 14, and a capacity, 15, connected across the line may be used for safety and convenience of operation but they are not necessary.

There is connected in shunt around the tube a circuit having capacity and inductance, such circuit extending from the positive electrode terminal 2 to a capacity, 16, an inductance, 17, a second capacity, 18, to the negative electrode terminal 3.

The inductance 17 is in inductive relation to the coil, 19, forming part of a resonant circuit here shown as an aerial 20, connected to the ground at 21. A work circuit of different characteristics may be substituted for the aerial. The coils 17 and 19 may be capable of being tuned, shortened or lengthened, and moved nearer or further apart to vary their mutual influence, or may be fixed when designed for a definite purpose. In case a resonant or forced work circuit be used the capacity 16 may be variable.

There is extended from the positive electrode connection a connection, 22, to the tube 8 through a variable resistance, 23, and also a similar connection, 24, through a variable resistance, 25, to the tube 9. The variable resistance 23 and the variable resistance 25 may be replaced by condensers 30' and 30" (Figures 1ᵈ, 1ᵉ and 1ᶠ). The tubes 8 and 9 when desired, are connected through the manipulation of switches 68 and 69 by means of the secondary, 26, of an induction coil, the primary, 27, being connected with and forming part of a circuit containing a source of variation, 28, here shown as a microphone, and a source of direct current, 29, in the circuit here shown as a battery. This circuit serves to cause electrical variation to be impressed on the tubes 8 and 9 by means of the secondary 26. This circuit is omitted when not desired by having switches 68 and 69 open, although inductance 26 is often useful in the operation of the device even if not used as a means of varying the operation in which case switches 72 and 73 are opened and switches 68 and 69 are closed, and a condenser, 30, if desired, is connected in the circuit by further movement of switch 68.

To operate the pulsator, the negative electrode circuit is first started (with two or three amperes or more flowing). This can be done by shaking the pulsator. The main current from the generator is then turned on by closing the switches, 31, and 32. The pulsator is set in operation. The pulsator should start, but if it does not start of itself the resistances 23 or 25 should be adjusted or a high potential impulse obtained by short-circuiting the tube through a switch, 74, and quickly opening the switch, see Figure 36, may be used for starting as shown in United States Patent 1,110,543 in certain service.

Its operation is as follows:—Current flows through the inductances 12 and 13 into condensers 16 or 18, at the same time impressing an electromotive force on the tubes 8 and 9, the current flow being limited by the resistances 23 and 25 as well as by the electrode resistance at the interior of the tubes as well as by the vapor forming part of these circuits. The potential at the main electrodes having risen to a certain value, the current starts through the pulsator and the condensers 16 and 18 discharge, the rate of discharge being modified by the characteristics of the circuit; that is, the condenser circuit 2, 16, 17, 18, 3, is completed through the tube, and the discharge passes from 2 through the tube 8, bulb 10, tube 9 to electrode 3. The energy of the circuit passes over to the resonant circuit by means of the coils 17 and 19 by reason of their field and magnetic interlinkage.

As the current does not pass through the pulsator in the reverse direction, the resonant circuit cannot return the energy it has received back through the pulsator. The rapid re-establishment of the high starting resistance of the path between the main electrodes is brought about by the charge impressed thereon through the control circuits terminating in terminals 8 and 9 and thus prevents a discharge of the condensers 16 and 18 until a high voltage is reached. Any variation impressed on the terminals 8 and 9 will vary the voltage at which current will start between the main electrodes.

The inductances 12 and 13 prevent a short circuit of the main current through the pulsator at the moment of the discharge of the condenser circuit, tending to maintain the main current constant although they may permit some variation.

The condenser circuit, having discharged in one direction to its limit, and the current through the pulsator having ceased, the condensers are filled by the main line current as stated and the cycle continues in continuous operation.

The frequency of the impulses through the pulsator is controlled by all the electrical factors of the circuits and particularly by the current flow through the circuit 22 and 24 and resistances 23 and 25 to the tubes 8 and 9 which is controlled by the resistances 23 and 25; also by the capacity and inductance characteristics of the discharge circuit 16, 17, 18, which are important factors influencing the rate of discharge, and also by the time period of the resonant work circuit and the mutual magnetic interlinkage of the coils 17 and 19. The operation of the pulsator is modified by the temperature and in order to insure uniform operation any well known expedient may be availed of to control the temperature such as an air blast, see Figure 37.

The result of the operation for separate settings is shown in the current voltage diagrams of various parts of the circuit, Figures 2, 3, 4 and 5. These diagrams in connection with the legends thereon will be clearly understood without detailed explanation.

Figure 3:
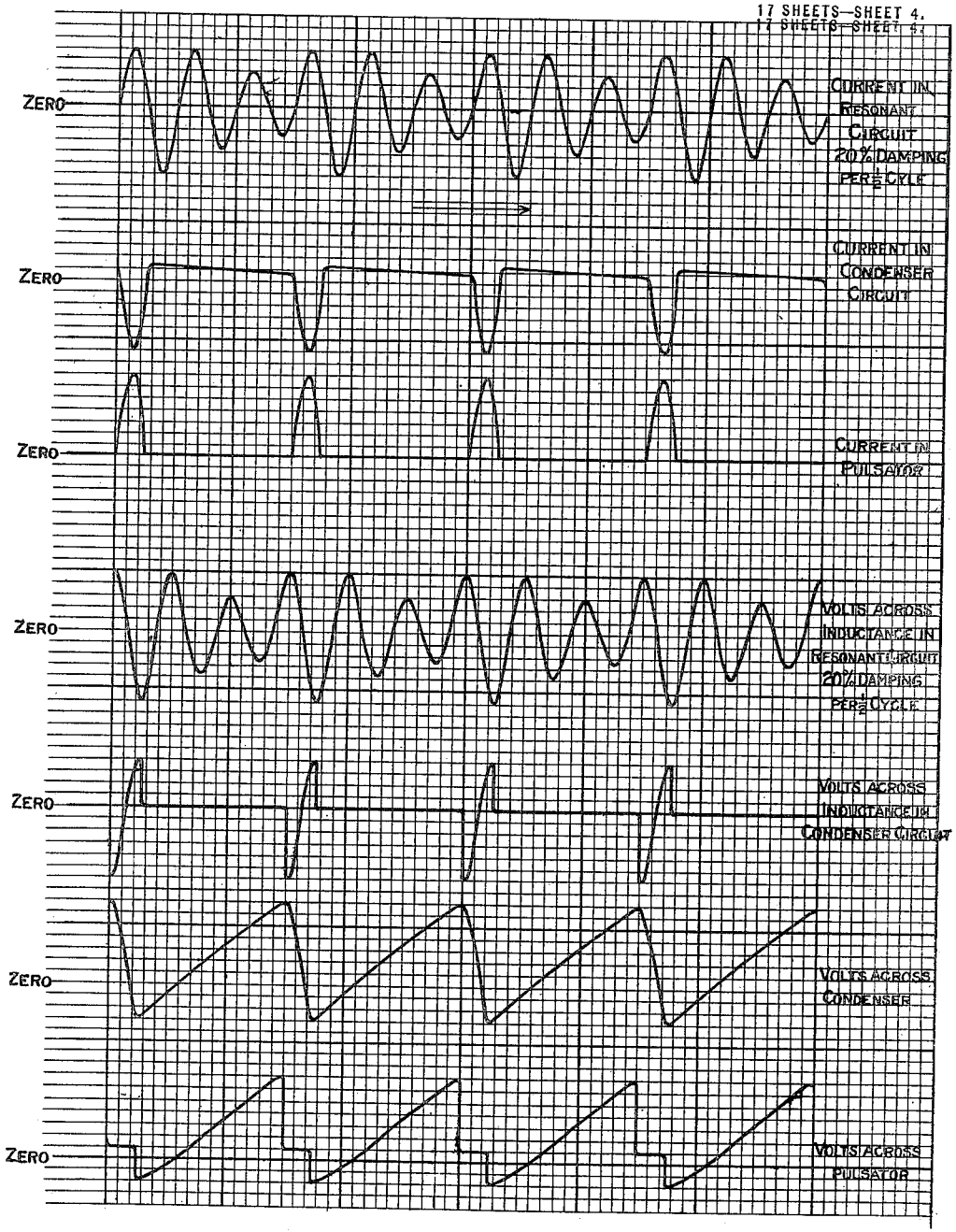
Figure 4:
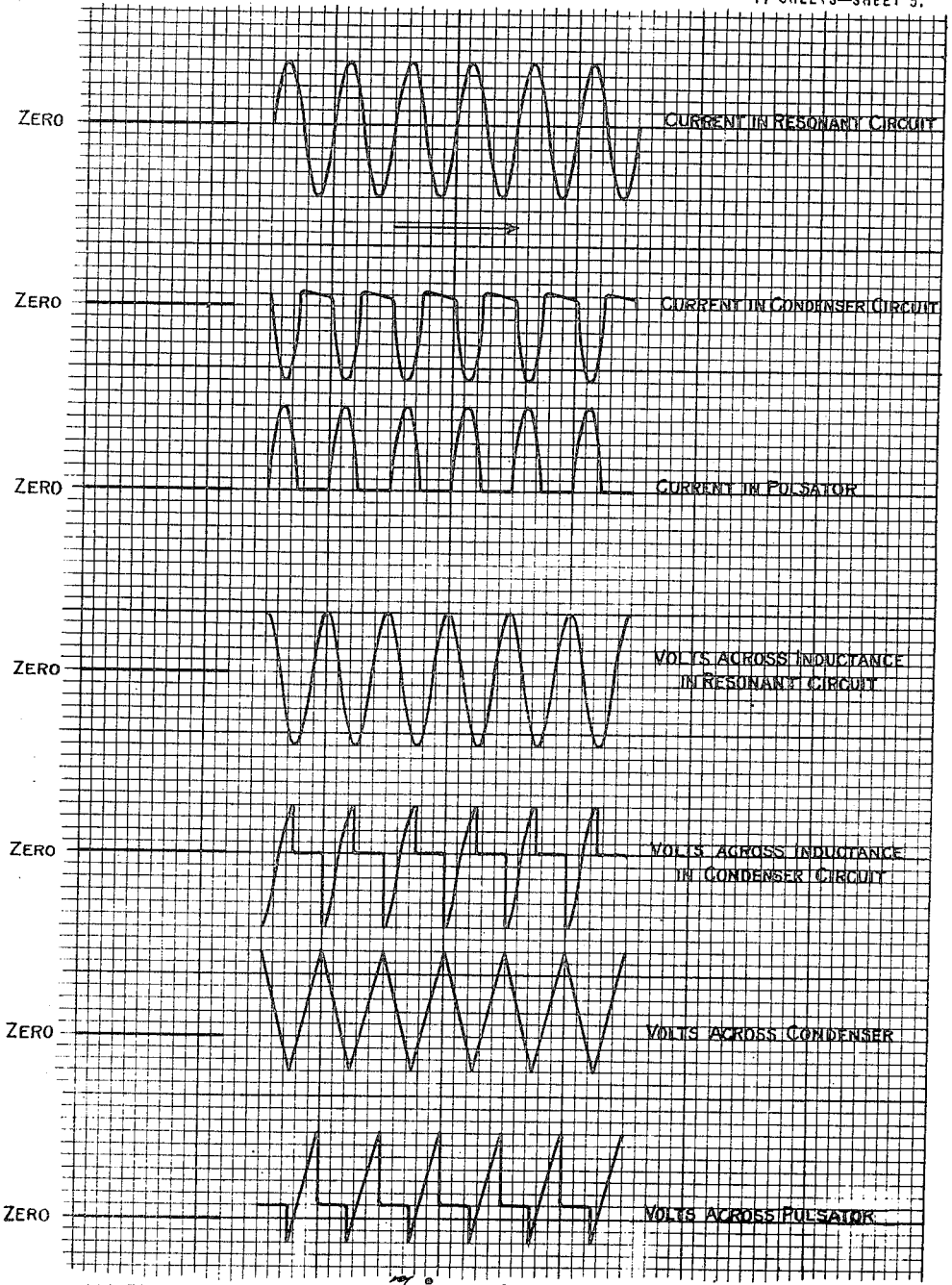
Figure 5:
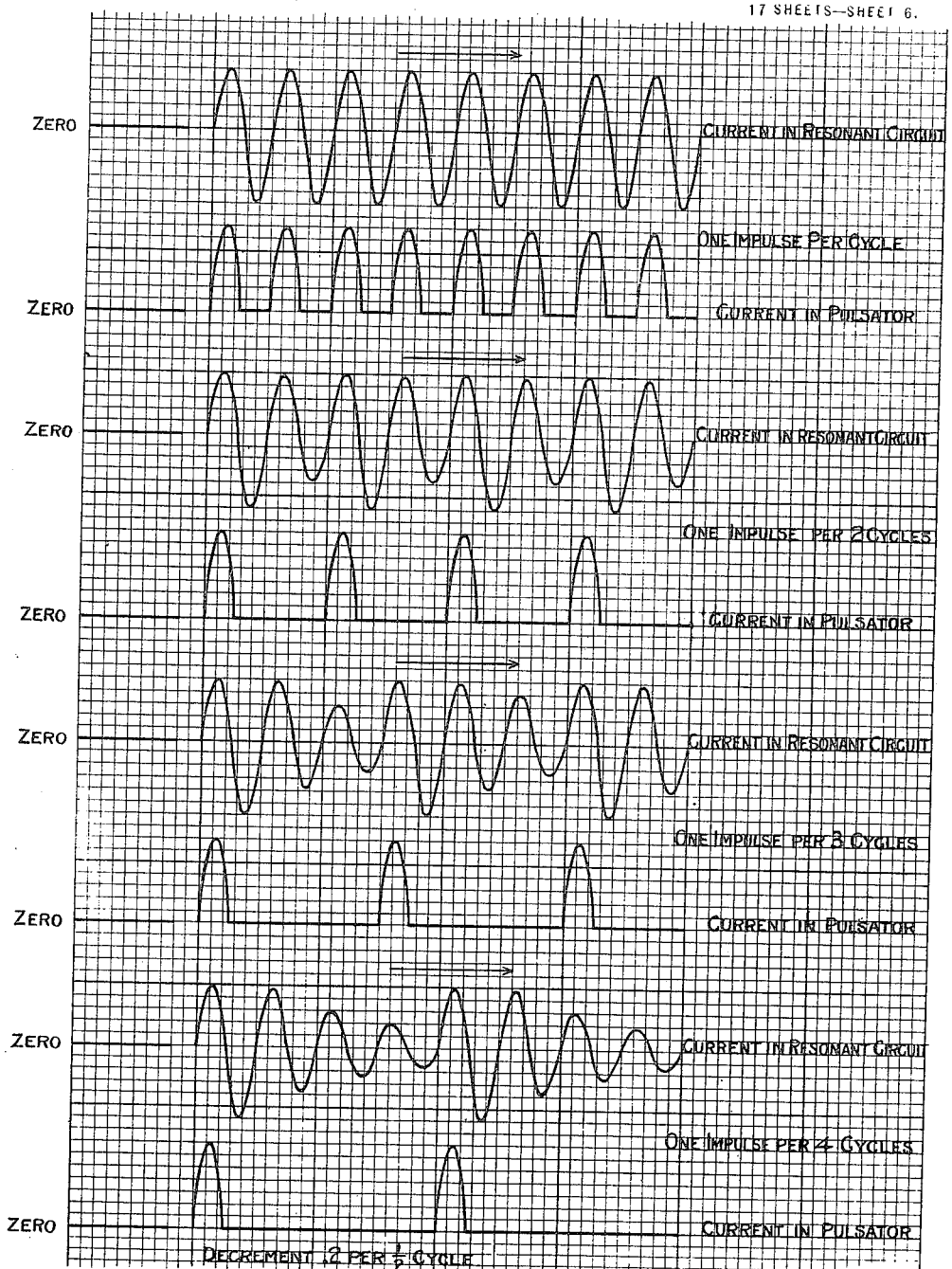

By varying the current or relative values of the current flow in the tube circuits 22, 23 and 8, and 24, 25 and 9, through the manipulation of resistances 23 and 25, or the condensers 30' and 30'', the time value of the pulsator pulse is altered and the operation of the pulsator may be changed from a relation shown in Figure 2 to any relation as shown, for instance, by Figure 3, Figure 4 and Figure 5.

Referring again to Figure 1, when the switches 68 and 69 are closed, the secondary of an induction coil 26 is connected to tubes 8 and 9 and joining them electrically and by further manipulation of switch 68 a condenser 30 is placed in the circuit to limit direct current flow when desired. Electrical variation in the primary of the induction coil will bring about variations of current flow through the secondary which will cause electrical variation at the tubes 8 and 9 and these variations will bring about variations in the action of the pulsator, which in turn will modify the energy delivery of the pulsator and may bring about such modifications of cycle as indicated in Figures 2, 3, 4 and 5 and may change from one cycle to another, and create various incident modifications due to transition reactions in change and effort to change and the consequent modification of the action and reactions of the various circuits. The actions and reactions of the pulsator and characteristics of the various circuits and their factors are all very important particularly in the effort and resisting effort of change from one modification to another, as the inductance component of one circuit is affected and modified by the other through the coils 17 and 19.

When the current in the primary of the induction coil is caused to vary, as by a microphone 28 included in its circuit, corresponding variations will be transmitted by the pulsator to the resonant circuit which, being an aerial, will radiate corresponding variations which, being received by a second aerial in tune with it and translated by a suitable receiver, will reproduce the original variations imposed by the microphone, and if these were created by speech, will faithfully reproduce the speech and qualities of tone of the original sounds. Variations may likewise be produced by variation of either or both of the resistances 23 and 25. A key or tone circuit may be used in connection with the circuit 22, 23, 8, for sending wireless telegraph signals as shown at 67, Fig. 28, and 28, Fig. 29. The signals may be conveyed to the apparatus by the microphone 28, Figure 30, or equivalent device. An induction coil may be used, the secondary of which forms part of the circuit 22, 23, 8, for governing the variation, see Figure 29.

Having reference to electrical diagram, Figure 2, the condensers may be caused to successively discharge by control of the pulsator at a time period greater than the time required for the current in the resonant circuit to decay to zero. In this case, the relation of the electrical characteristics are represented by Figure 2, and separated trains of alternating current waves are produced.

By causing the pulsator to operate at a rate faster than the time required by the resonant circuit to come to zero, or when the action of the pulsator is more rapid with reference to the decrement of decay of the resonant circuit, the electrical characteristics may be represented by diagrams Figures 3, 4 and 5. That is, the alternating current may be reinforced every alternation or as frequently as desired. These various relations may be changed from one to another by varying the characteristics of the organization. The supply is modified by variation of the resistances 23 and 25, and also may be caused to vary by the action of the induction coil 26 and 27, and by variation of the mutual inductance of coils 17 and 19, and by variation of other electrical elements of the organization.

The interlinkage of coils 17 and 19 exercises an important influence on variations and any factor that will change their relation will affect the action of the pulsator and the organization; for example, varying any of the characteristics of the aerial, as by introducing a microphone, 65, Figure 26, or variable capacity, such as a condenser, 66, Figure 27, associated with it, or varying the elements of the resonant circuit, or the discharge condenser circuit, or any circuit which will affect the interlinkage of these coils, will produce variation of energy in the organization and affect the frequency and the energy translated and transmitted.

It will be seen on comparing the cycles, Figure 5, that if one operation of the system is caused to change from one cycle to another, the fundamental time period of the resonant circuit or the impulse period of the discharge circuit must be changed. The object of such change while the system is in operation is to vary the energy delivered or radiated and thus accomplish the transmission of signals or speech. The change when passing through a transition, or attempting to pass through it, is probably facilitated or prevented by a redistribution of the flux existing at the coils 17 and 19, as the distribution of flux affects the coupling and mutual inductance of these circuits and consequently their time periods, and it has been found, when transmitting speech, advantageous to have them bear a definite relation to each other, and the coils are more easily adjusted and operate more easily for this purpose when loosely coupled, although other relations operate well. It is frequently useful in order to adapt the pulsator to a given aerial, that the discharge circuit of the pulsator have more capacity and less inductance for the same period of oscillation than the resonant circuit associated with it, and it is convenient for the transmission of speech, music and like variations. The natural, or free, time period of the two circuits need not be identical.

In an organization as described the capacity of the discharge circuit of the pulsator may be less than the capacity of the resonant circuit or forced circuit associated with it and, for some purposes, it is useful as it materially expands the range of work circuits to which the organization can be adapted. In most cases the former is preferred if circuits of identical period are not used.

The characteristics of the pulsator are quite positive and definite. The reactions that take place in the various circuits with the counter reactions render a complete explanation most difficult as a variation of the characteristics in any one part will require variations in other parts incident to the action of a very sensitive device.

As has been stated, the time action of the pulsator is largely controlled by the current passed into it by the circuits 22, 23 and 8, and 24, 25 and 9. The pulsator may be operated by static conducting bands on the glass wall of a device, wherein the metal tubes are omitted, replacing the metal tubes 8 and 9 for control purposes. Under these conditions the organization is most sensitive to the static effects of the capacity, and to electric or magnetic influence. When static bands are used, variable condensers take the place of, or replace, resistances 23 and 25 connecting the static bands or conducting coating forming the circuits 22 and 24.

Such a form of device, consists of a glass tube, see Figure 6, having at one end an enlargement, 34, containing the positive electrode 2 and at the other end an enlargement containing the negative electrode 3 and an auxiliary keep-alive positive 4. On the tube are two conducting sleeves, 35 and 36, capable of receiving charges and transmitting the effect through the tube whereby the characteristic of the vapor is modified. The sleeves are connected through variable condensers, 37, 38, 39 and 40, to the positive or negative lead so as to transmit at will positive or negative charges or both in any quantity required whereby the action of the pulsator is modified. By the action of static bands the effect of negative current can be made to influence the device without the same negative electrode resistance or reluctance phenomena which is present when direct conduction is attempted in quantity as with the use of tubes 8 and 9, Figure 1. The operating voltage of the pulsator is usually higher with negative influence than with positive. Variable condenser, 41, when desired, is connected between conducting bands, 35 and 36 by closing the switches 70 and 71 and used to modify the action when a definite relation has been established by means of the rest of the apparatus, or an arrangement shown on Figure 1, elements 26, 27 may be used connecting 35, 36 as shown in Figure 25. The discharge circuit connects with the positive terminal condenser 16, inductance 17, and negative terminal 3.

The two cases cited comprise a positive and a negative terminal and an intermediate conducting vapor, two sections of which are capable of being charged or released of charge independently. That is, it appears as if the device may be considered to consist of conductor terminals (or electrodes) and five separate vapor sections between them, two of which are capable of being charged or discharged independently of the internal conductor, terminals or electrodes. The section adjacent to the positive end is akin to the positive and may be connected to it through a condenser for purposes of variation, as shown in Figure 1ª, and will operate if such section be used as the positive electrode as shown in Figure 31. These five sections operate, but more alternate conducting sections may be introduced for further modifying the action of the device and for applying other sources of variation, or otherwise assisting the action for specific uses, or rendering more positive the action already arrived at. They may usefully serve to allow the use of a different operating voltage, also to change the resistance of the device.

One static band, 42 or 43, connected to the positive or negative through a limiting capacity at the restriction of the device, Figure 7, Figure 7ª, may be used to modify the action and the time of the pulse of the oscillator as well as its force, and by means of it, the pulse may be made to create variations of energy transmitted.

The pulsator is capable of control by means of one conducting section, as 8, Figure 1 shown in Figure 32, or one static band section 35, Figure 6 shown in Figure 33, but the action of two sections, as in Figures 1 and 6, is usually more definite and practical.

A modification consists of substituting one static connection in place of the direct conducting tube connections shown in Figure 1, such as substituting static band 35, Figure 6, for 8, Figure 1 shown in Figure 34, or 36, Figure 6, for 9 Figure 1, shown in Figure 35. This connection may serve best where negative current is availed of.

If in place of the conducting tubes, Figure 1, conducting perforated plates be substituted, the action of the oscillator tends to become erratic and is exceedingly sensitive, yielding readily to any internal or external influence so as to be difficult of definite control.

Internal conducting tubes or the equivalent may be used in place of a section of conducting wall 8 and 9 as shown, Figure 1. Such are shown in Figure 8, Figure 9, Figure 10, Figure 11 and Figure 12, having suitable terminals for the electric connections. Figures 13, 13ª, 13ᵇ and 13ᶜ illustrate parallel multiple internal conducting tubes and means for electrical connections illustrated in vertical and horizontal section.

There is considerable difference in the action if inductance be substituted for resistance in any of the tube control circuits, for instance, Figure 1, inductance at 26 is permissible while the operation usually is not facilitated when inductance is substituted for resistances 23 or 25.

Referring to Figure 1, a condenser, 30' or 30", for adjusting or limiting current flow may be included in the leads 22 or 24 or both of them as shown at 30' and 30" in Figures 1ª, 1ᵇ and 1ᶜ, respectively, and if the condensers are properly adjusted, the respective resistances may be omitted as shown in Figures 1ᵈ, 1ᵉ and 1ᶠ, respectively, but the organization shown by Figure 1 will, in many cases, prove more satisfactory.

Tube 8, being affected by a source of variation such, for instance, as is shown in Figure 1, may be connected with the positive lead and act as a positive electrode, in which case the positive electrode shown in Figure 1 may be dispensed with or remain unconnected, as shown in Figure 31. With this arrangement the reproduction of such variations as are required for the articulation of speech, are very clear and pronounced, but the arrangement, Figure 1, is probably preferable.

It is important that the positive chamber be not made too small for ordinary voltages, as, when too small, the action is modified and if the walls become coated by material thrown off from the positive electrode, the voltage required to operate the oscillator will be changed. When the chamber is sufficiently large this effect disappears.

The size and location of both the positive electrodes and its chamber are important especially for use in connection with high voltages.

When it is desired to use an incandescent body as a negative electrode, such as a glowing filament, 60, Figure 24, tungsten serves such purpose well as it possesses physical and chemical properties well suited for the purpose. It may be operated at an extremely high temperature and may be used to combine with oxygen given off by other parts of the device and render it harmless so far as the operation of the device is concerned and may, for this purpose, be used to extend the working life of the device, and it is useful for this purpose in connection with mercury vapor in the device no matter how attenuated.

Figure 23 represents a form of pulsator or vacuum gas or vapor device with dimensions suitable for one-half or more amperes incoming direct current of 200 volts or more, and much higher voltage may be used, 600 volts or more, and has an operative pulse or throb frequency of 5,000 to 10,000 per second and less, to 50,000 or 100,000 per second or more, the action of the device being very elastic and may be controlled as described above.

The negative terminal 3 is of mercury, having a point of platinum or tungsten, 61, for fixing and stabilizing the negative spot or discharge, an auxiliary positive electrode consisting of a metal plate 4 with a hole in it located in the dark space of the negative. The tubes 8 and 9 are of platinum and separated by the glass bulb 10. When the tubes, 8 and 9 are supplied with flanges as shown in Figure 17ª, the device will carry four amperes or more. The relation of the length of the tubes to the diameter depends largely on the service, but for many uses the length in linear inches may equal sixty times the area of cross-section taken in square inches.

Lower frequencies are more easily obtained with larger areas of cross-section, the frequency tending to vary inversely with the cross-section.

Figure 14 represents a device having the positive terminal formed of mercury and means for preserving it by supplying an overflow and providing it with a condensing chamber of such capacity that the condensed mercury supplied to it exceeds that of volatilization.

In Figure 15, a shield is located surrounding the main positive terminal to catch matter projected from it in order to prevent the wall of the vessel surrounding it from becoming conducting after use and impairing the charge characteristics of the positive and its surroundings.

Figure 16 is a modified form of insulating connections between the tubes to prevent the wall from becoming conducting from a deposit from the tubes or electrodes consisting of a shield in proximity to the wall.

Figures 17 and 17$^a$, and 18, are forms of flanged tubes useful to remove the glass wall of the container from the heating effect due to the restriction imposed by the tube.

Figure 18 provid : means for circulation of oil or other liqu d around the tube to carry away the hea generated and maintain the tube at a des red temperature.

In Figure 19 is shown a special form of projection from the negative electrode consisting of a bent double sheet of metal having a small space between the sheets; the space acts as a wick and supplies mercury from below as it is volatilized by the current. 19$^a$ is an enlarged cross section and 19$^b$ is a vertical section.

Figures 20 and 20$^a$ represent another form of projection for the negative electrode useful for anchoring the negative spot, consisting of three fine wires of tungsten or platinum.

Figure 21 is a positive electrode formed of tungsten wire rolled up to form a cylinder with means for preventing sagging. Tungsten does not disintegrate in service as rapidly as iron.

When tungsten is used in a vacuum gas or vapor device, and particularly in connection with a residual mercury vapor present, the device has the property of remaining clean.

The distintegration effects, due to service, are less. That is, a device with an iron positive that has a tungsten point projecting from the negative Figures 20, 20$^a$, does not coat the glass in service to the same extent as would be with the use of platinum. This might be accounted for by the affinity of tungsten for oxygen and the inertness chemically of its oxide and the low vapor tension of the oxide. A tungsten point for the service of anchoring the negative spot on a mercury electrode should be clean, otherwise, considerable running time may elapse before it may operate as an anchor.

In place of an aerial as shown, Figure 1, 20, 19, 21$^A$, work circuit 19, 44, 45, Figure 6 may be substituted, shown as a resonant circuit, but a forced circuit may be used in place of a resonant circuit.

Figure 22 illustrates a pulsator controlled by magnetic action. The pulsator 51 having been connected in an organization, such as is shown in Figure 1 has a magnet 52 with movable pole pieces 53, 54, similar to those used in telephone construction, by which variations are applied to the tube 8, Figure 1, by means of the circuit, microphone, or other source of electrical variations 56, source of electric current 57 and coils 58, 59, surrounding the pole pieces 53, 54, whereby the action of the pulsator is modified, and cause corresponding energy variations in a resonant circuit associated with it, such as is shown in 20, 19, 21, Figure 1. Magnetic action may be applied in many different ways but the above serves as an illustration.

Current control of pulsator may be supplemented by magnetic action. The magnetic action may be variable and control current kept constant or the magnetic action may be fixed or stable in its action and the control current be variable or both may be stable or variable.

A mercury negative electrode is illustrated in the examples given excited by an auxiliary circuit, but any negative electrode in an excited condition that will act to receive positive current from the vapor may be used, such as an electrode of solid material maintained at a high temperature or in an incandescent state shown at 60, Figure 24.

With inductance in the supply circuit, the ratio of capacity to inductance, in the discharge circuit of the pulsator, is very important. The supply voltage being considered constant, the voltage to which the condensers become charged varies with increase of capacity and for the time of discharge the energy of an individual pulse increases. On increasing the supply voltage, the frequency of the pulse increases. On increase of inductance, the frequency of the pulse is varied and the voltage, to which the condensers are charged, also is varied. On increasing the voltage of the supply circuit, the frequency of the pulse tends to increase. The above is true in a general way but is seriously modified by the characteristics of the circuit by means of which the energy is transferred and by the external means of control of the current path through the pulsator.

The frequency of the pulse tends to decrease with increase of the cross-section of the area of the restricted portions such as the tubes referred to above.

As it is possible to produce alternating current of definite time period or frequency for wireless transmission of energy and as the frequency may be varied while constant energy is being transmitted, variations of frequency may be made corresponding to energy variations in a telephone circuit transmitting speech, and such variations of frequency may be made to depart from a fundamental time period or frequency in so much that on being received by a circuit designed to receive energy of definite frequency they will produce energy variation in the circuit of the receiving instrument corresponding to the variations of frequency transmitted whereby speech or signals are translated, although the energy transmitted remains constant. As the energy as well as the frequency of each pulse is governed by the control circuits, it is possible for the total energy to remain the same although the pulse frequency is varied; the frequency of a continuously oscillating aerial coupled to the pulse circuit will be momentarly varied thereby.

As a maximum or minimum of energy radiated is not necessary for the transmission of speech or other signals, the maximum radiation may be continuously maintained, therefore the greatest distance may be obtained by the sending apparatus.

I claim as my invention:

1. In a device of the character described an exhausted container, electrodes, means for supplying current thereto, means for causing the flow to be made and interrupted at regulated frequency, and means external to the device for electrically affecting the character of the path between the electrodes.

2. The combination of an evacuated container, positive and negative electrodes therein, a system of resonant circuits connected therewith acting to produce regulated electric pulses of intermittent current flow therethrough, a source of electric variations and means for affecting the character of the current path between the electrodes by the variations of said source.

3. The combination of an exhausted container, main positive and negative electrodes, a supplementing positive electrode means for continuously passing uniform current to the negative electrode, and a circuit containing a condenser and an inductance connected with the first named electrodes, potential electrodes located adjacent to the path between the main electrodes and an electrically variable circuit connected with the potential electrodes.

4. In a pulsating current generator, the combination of a resonant circuit, an intermittently conducting gas or vapor tube of the character described connected therein, potential electrodes in operative relation to the tube, electrical connections for charging the same and a circuit of varying electrical characteristics connected therewith.

5. The combination of an intermittently conducting gas or vapor tube of the character described, an adjustable resonant circuit connected therewith, adjusted to produce regular interrupted current flow through the tube of desired frequency, and means for modifying the character of the current flow and interruption in response to separately generated current waves.

6. An intermittently conducting gas or vapor tube of the character described for producing regulated interrupted current flow or pulses and means for controlling the frequency of such pulses applied to specific sections of the tube.

7. The combination of an intermittently conducting electric device of the character described, two electric circuits of definite time periods in magnetic interlinkage, a source of variations, means for controlling the pulse period in accordance with said variations, and means for the control of the energy flow by the variations of the time periods of the pulses.

8. The method of controlling the discharge through a gas or vapor vacuum device acting as the discharge path for a circuit of capacity and inductance which consists in causing the discharge to exert forced variation of the characteristics of the path between the electrodes to determine the voltage and time of the following discharge.

9. The combination of an intermittently conducting gas or vapor vacuum device having electrodes, for producing pulsating current, a direct current supply circuit, inductance in the supply circuit, a circuit consisting of capacity and inductance connected to the device through an auxiliary circuit to automatically force control of the characteristics of the path between the electrodes.

10. A gas or vapor vacuum device having a current path, a supply circuit including inductance, a circuit consisting of capacity and inductance in parallel with the device, means for constricting a portion of the path, and means external to the device for electrically affecting a portion of the natural characteristics of the current path through the constricted portion of the device.

11. An intermittently conducting gas or vapor vacuum device having electrodes, for producing electric pulses, a supply circuit, a circuit having capacity and inductance in parallel with the device, and means for affecting the path between the electrodes electrically.

12. The method of creating pulses of definite time period from a direct current source in an electric circuit including an intermittently conducting electric device which consists in producing current flow in said circuit, terminating the flow of current by the characteristics of the circuit and causing the reaction resulting from the termination of current flow to act on a limited section of the current path and reestablish current flow.

13. The method of generating periodic pulses of intermittent current flow from a source of continuous electromotive force which consists in causing the current to traverse a gas or vapor section and creating variations from the natural characteristics of the gas or vapor path by affecting an intermediate section of the gas or vapor path by applying the electromotive force to said intermediate section.

14. An intermittently conducting gas or vapor vacuum device, having unidirectional conductivity as to the main electrodes, for producing intermittent current flow, comprising a negative electrode and means for maintaining it in an excited condition, a main positive electrode and means external to the device for controlling a section of the current path between the electrodes in combination with a circuit having inductance.

15. An intermittently conducting gas or vapor vacuum device, having unidirectional conductivity as to the main electrodes, means for producing intermittent current flow comprising a negative electrode and means for maintaining it in an excited condition, a main positive electrode and means external to the device for controllng the conductivity of the vacuum, gas or vapor between the electrodes in combination with a supply circuit having inductance, and a circuit having capacity and inductance.

16. An intermittently conducting gas or vapor vacuum device, having unidirectional conductivity as to the main electrodes, for producing intermittent current flow comprising a negative electrode and means for maintaining it in an excited condition, a main positive electrode and means external to the device for controlling a section of the gas or vapor path between the electrodes in combination with a supply circuit having inductance and a consumption circuit.

17. The method of producing unidirectional electric pulses in an intermittently conducting vacuum, gas or vapor device having electrodes, the negative electrode being maintained in active condition, which consists in applying current to the electrodes of said device, and establishing forced control of a section of the gas or vapor path between two electrodes.

18. The method of producing unidirectional electric pulses in an intermittently conducting vacuum, gas or vapor device having electrodes, the negative electrode being of mercury and maintained in active condition which consists in applying current to the electrodes of said device, and establishing control of a section of the path between the electrodes.

19. A source of direct current supply, an intermittently conducting vacuum gas or vapor device connected across the supply, inductance in the supply, a circuit having capacity and inductance in parallel with the device, a work circuit connected to it and means external to the device affecting the conductivity of the vacuum gas or vapor for varying the operation.

20. A source of direct current supply, an intermittently conducting vacuum gas or vapor device connected across the supply, inductance in the supply, a circuit having capacity and inductance in parallel with the device, a work circuit connected to it and means external to the device affecting the gas or vapor for controlling the supply current.

21. A pulsator consisting of an intermittently conducting gas or vapor vacuum device having restricted portions, a supply circuit connected to the main terminals of the device, and a branch circuit, including resistance electrically connecting one of the main external electrode terminals to a section of the path through the device between the terminals.

22. A pulsator consisting of an intermittently conducting gas or vapor vacuum device having restricted portions, a supply circuit connected to the main terminals of the device, and a branch circuit including a condenser electrically connecting one of the main external electrode terminals to a section of the path through the device between the terminals.

Signed at New York in the county of New York and State of New York this 17th day of March, A. D. 1915.

PETER COOPER HEWITT.

Witnesses:
WALTER E. F. BRADLEY,
WM. H. CAPEL.